M. GORDON.

Improvement in Horse-Collars.

No. 132,206.            Patented Oct. 15, 1872.

WITNESSES.
J. E. Upham.
D. H. Dane.

INVENTOR.
Matthew Gordon,
Chipman Hosmer & Co,
Attys.

UNITED STATES PATENT OFFICE.

MATTHEW GORDON, OF BRIGHTON, IOWA.

IMPROVEMENT IN HORSE-COLLARS.

Specification forming part of Letters Patent No. 132,206, dated October 15, 1872.

*To all whom it may concern:*

Be it known that I, MATTHEW GORDON, of Brighton, in the county of Washington and State of Iowa, have invented a new and valuable Improvement in Horse Collars and Hames; and I do hereby declare that the following is a full, clear, and exact description of the construction and operation of the same, reference being had to the annexed drawing making a part of this specification, and to the letters and figures of reference marked thereon.

Figure 1:
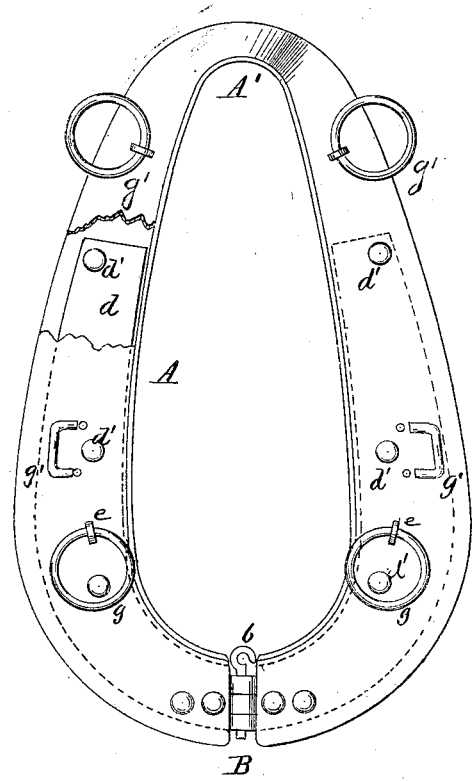
Figure 2:
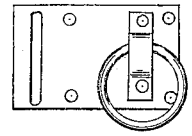
Figure 3:

Figure 1 of the drawing is a representation of a front view of my invention, with leather casing partly removed. Figs. 2 and 3 are details of the same.

My invention has relation to a horse-collar which may be used without hames; and the novelty consists in the arrangement within the collar of metal plates sufficiently flexible and inelastic to allow of the collar being fitted or adapted to the irregularities of the surface of the shoulders and chest of the horse. This flexibility and inelasticity extend to that degree that the collar may be readily adapted to any one horse not differing greatly in size from the one to which it the most readily fits—*i. e.*, the flexibility of the plates will allow of the collar being taken from the one horse to which it had been fitted and placed upon another horse to which it can as readily be fitted, and adapted to the irregularities of surfaces.

Referring to the accompanying drawing, A represents a leather-padded horse-collar constructed without the projecting rim usually provided for the reception of the hames. The top part of the collar at A' is made sufficiently yielding to allow the collar to spread open when the lower fastening is loosened, and to be thus easily placed on the horse's neck. The sides of the collar are connected together at their lower ends by means of a hinge, B, which allows the collar to be expanded and contracted so as to lie on the animal's neck more easily, and adapt itself to the size thereof.

In placing the collar on the horse's neck, the hinge-pin *b* is taken out. The sides of the collar may be then spread apart, and the collar arranged without the necessity of forcing it over the animal's head. Within an inside pocket, next to the facing leather of each side of the collar, is arranged a flexible inelastic strip of metal, *d*, fastened to the facing leather by means of rivets. These plates of metal, in addition to the function hereinbefore stated, serve to stiffen and strengthen the collar, and, also, to receive the staples *e*, holding the trace-rings and loops *g g*, and other metal attachments. These plates extend only as high up as shown in Fig. 1.

I claim—

As a new article of manufacture, the horse-collar having the flexible inelastic plates of metal, arranged as and for the purposes herein recited.

In testimony that I claim the above I have hereunto subscribed my name in the presence of two witnesses.

MATTHEW GORDON.

Witnesses:
 ROBERT THOMPSON,
 J. K. EDWARDS.